(No Model.)

B. SCHAD.
WHEEL.

No. 355,344. Patented Jan. 4, 1887.

Witnesses

Inventor
Bernhard Schad,
By his Attorney

UNITED STATES PATENT OFFICE.

BARNHARD SCHAD, OF BATAVIA, NEW YORK, ASSIGNOR TO HENRY PHELPS AND JOHN P. SCHAD, BOTH OF SAME PLACE.

WHEEL.

SPECIFICATION forming part of Letters Patent No. 355,344, dated January 4, 1887.

Application filed June 1, 1886. Serial No. 203,824. (No model.)

*To all whom it may concern:*

Be it known that I, BARNHARD SCHAD, a citizen of the United States, residing at Batavia, in the county of Genesee and State of New York, have invented certain new and useful Improvements in Wheels; and I do hereby declare the following to be a full, clear, and exact description of the invention, such as will enable others skilled in the art to which it appertains to make and use the same.

My invention relates to wheels for vehicles and other purposes, and has for its object to make a suspension-wheel in which the expansion of the tire will have a tendency to tighten the connection between the tire, felly, and spokes, and in which the spokes can be tightened by the application of a wrench to the nut which secures the spoke to the hub without turning the spoke, and has among other objects to strengthen the wheel and otherwise improve it, as will appear from the following description; and to such ends it consists in the construction and the combination of parts hereinafter particularly described, and then sought to be specifically defined by the claims.

Figure 1:
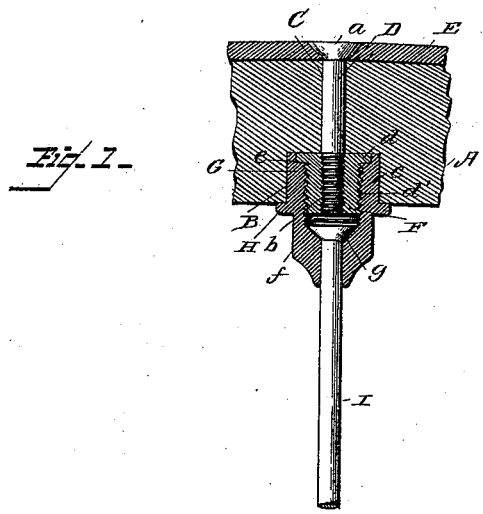
Figure 2:
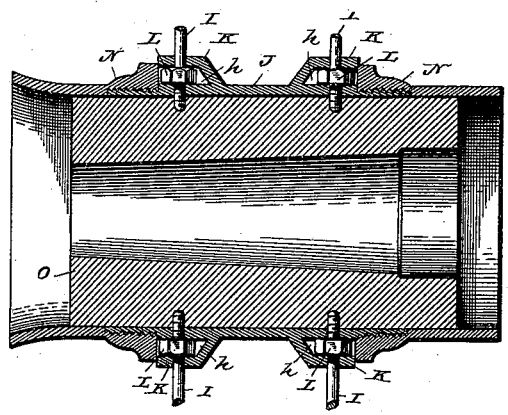

Figure 1 of the drawings is a vertical section through part of one spoke, nut, tire-bolt, and portion of the felly and tire. Fig. 2 is a longitudinal section through the hub, showing manner of attaching the spokes thereto.

In the drawings, the letter A designates a portion of the felly formed with a socket, B, in its under face and a hole, C, for the passage of the tire-bolt D, which is formed with the head $a$ at one end, which bears against the tire E, and with screw-threads $b$ at the opposite end, on which screws the nut F. This nut is formed exteriorly with threads $c$, and preferably with a flange, $d$, and to its exterior is fitted a sleeve, G, formed with interior screw-threads, $d'$, so as to screw onto the nut. This sleeve is also preferably formed with a recess, $e$, at its upper end, in which the flange $d$ of the nut F will fit, so that the top faces of the nut and sleeve will be flush with each other. The exterior of the sleeve is formed with a collar or flange, H, which serves as a washer to bear against the under side of the felly, and is also formed with angular faces $f$, which permit of a firm grasp by a wrench in adjusting the sleeve and nut. The interior of the sleeve is contracted near its lower portion, so as to form a bearing for the enlarged head $g$, preferably of conical shape, of the spoke I, which passes through the lower end of the sleeve, the opening in which is contracted to conform to the size of the spoke. The spoke and tire-bolt are preferably made of the same dimensions. The nut and sleeve are so constructed that when in position with the spoke-head lying within the sleeve, a space, preferably of one-sixteenth of an inch, is left between the head of the spoke and bottom of the nut, so that the wheel will be rendered elastic and the spoke prevented from bending.

The hub is composed of a hollow casting, J, formed at opposite ends with raised overhanging flanges K, which form a chamber, $h$, for the passage of nuts L, which engage with the threaded ends of the spokes I, which pass through holes therefor in the flanges K, and which, if desired, may be made to pass through the casting J, as indicated in Fig. 2.

The ends of the casting are extended beyond the ends of the flanges and screw-threaded, so that caps N may be screwed thereon to form finished ends to the hub, and to prevent the nuts from turning.

The chambers in which the nuts fit are of such width that when the caps are removed the nuts can be turned with a wrench so as to adjust and tighten the spokes without the application of a wrench to the spokes themselves, which would deface them, especially if polished. The chamber is also preferably made of such depth, as shown, that a space will be left between the bottom of the nut and the bottom of the chamber, so that the spoke can be adjusted to the required extent to tighten it, although the spoke may be made to pass through the casting, as indicated by dotted lines in Fig. 2. The box O, which fits in the casting, may have either a straight or a tapering hole through it to suit the shape of the axle.

On putting the parts together the spoke is passed through the sleeve so that its head will lie in the lower part thereof; the nut is next screwed into the sleeve; the lower end of the spoke is then passed through the opening therefor in the casting of the hub and the nut applied to its end; the tire-bolt is then passed through the tire and felly, and the nut and sleeve screwed up thereon until the flange or collar is brought up tight against the lower face of the felly; then the nut to the lower end of the spoke is turned until the spoke is fixed rigidly and firmly in place.

The internal nut to the sleeve dispenses with the necessity of separate tire-bolts between the spokes and the nuts thereon which lie against the under side of the felly, and it throws the strain or tension direct from the tire to the hub, so that any expansion of the tire will draw the felly and spoke with it and bind the sleeve firmly against the felly, thus keeping all the parts tight and strong and avoiding the necessity of resetting the tire.

If the spokes should loosen in the use of the wheel they can be tightened by removing the caps to the hub and turning the nuts without applying a wrench to the spoke.

The hub-casting can be made of malleable iron or any other suitable material, and if desired the fellies can be made of metal.

The improvements can be applied to any kind of a wheel to which they are adapted, and they form an elastic suspension-wheel, strong in all its parts, in which the expansion of the tire tightens the parts instead of loosening them.

I lay no claim herein, broadly, to a sleeve fitting in a felly with a spoke fitting in said sleeve with a space at the end of the spoke, as such is, broadly, not new. My invention differs therefrom in the particulars specified in the following claims, whereby the advantages hereinbefore set forth in the description are obtained.

Having described my invention and set forth its merits, what I claim is—

1. In a wheel, the combination, with the spoke and felly of a sleeve bearing against the felly and having the headed end of the spoke fitting therein, an interiorly and exteriorly threaded nut fitting within the sleeve, and a bolt passed through the felly and having a screw-threaded end fitting within the interior threads of the nut, substantially as described.

2. In a wheel, the combination, with the spokes, felly, and tire, of a sleeve having the headed end of a spoke fitting therein, an exteriorly and interiorly threaded nut screwed into the sleeve, and a bolt passed through the tire and felly and having a threaded end screwed into the nut, substantially as described.

3. In a wheel, the combination, with the spokes and fellies, of an interiorly-threaded sleeve having the headed end of the spoke fitting therein, an interiorly and exteriorly threaded nut screwed into the sleeve, the said sleeve and nut being formed one with a recess and the other with a flange fitting in the recess, and a threaded bolt passed through the felly and having its threaded end screwed into the nut, substantially as described.

4. A suspension-wheel composed of the hub-casting formed with chambers $h$, the felly and tire, the tire-bolts passed through the tire and felly, the nuts screwed onto the bolts, the sleeves screwed onto the nuts, the headed spokes fitting at one end within the sleeves below the nuts and at the other end passed through a portion of the hub-casting into the chambers $h$, nuts applied to the threaded ends of the spokes within said chambers, and caps screwed onto the ends of the hub-casting and bearing against said nuts to prevent them from turning, substantially as described.

In testimony whereof I affix my signature in presence of two witnesses.

BARNHARD SCHAD.

Witnesses:
RUSSEL CROSBY,
JOHN G. JOHNSON.